(12) United States Patent
Abe (10) Patent No.: US 7,673,899 B2
(45) Date of Patent: Mar. 9, 2010

(54) AIRBAG AND AIRBAG APPARATUS

(75) Inventor: Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 602 days.

(21) Appl. No.: 11/299,756

(22) Filed: Dec. 13, 2005

(65) Prior Publication Data

US 2006/0131846 A1 Jun. 22, 2006

(30) Foreign Application Priority Data

Dec. 22, 2004 (JP) ............................. 2004-371440
Aug. 18, 2005 (JP) ............................. 2005-237883

(51) Int. Cl.
*B60R 21/233* (2006.01)
(52) U.S. Cl. ..................... 280/742; 280/729; 280/743.2
(58) Field of Classification Search ................. 280/729, 280/743.2
See application file for complete search history.

(56) References Cited

U.S. PATENT DOCUMENTS

| | | | | |
|---|---|---|---|---|
| 5,249,824 A * | 10/1993 | Swann et al. | ................. | 280/729 |
| 5,577,765 A * | 11/1996 | Takeda et al. | ................ | 280/729 |
| 5,599,040 A * | 2/1997 | Takahashi et al. | ........... | 280/729 |
| 5,913,535 A * | 6/1999 | Taguchi et al. | .............. | 280/729 |
| 6,059,312 A * | 5/2000 | Staub et al. | .................. | 280/729 |
| 6,086,092 A * | 7/2000 | Hill | ............................. | 280/729 |
| 6,155,595 A * | 12/2000 | Schultz | ........................ | 280/729 |
| 6,267,408 B1 * | 7/2001 | Jarboe et al. | ................. | 280/729 |
| 6,283,499 B1 * | 9/2001 | Nelsen et al. | ................ | 280/729 |
| 6,398,253 B1 * | 6/2002 | Heigl | ........................... | 280/729 |
| 6,550,809 B1 * | 4/2003 | Masuda et al. | ............. | 280/743.1 |
| 6,648,366 B2 * | 11/2003 | Dillon et al. | ................. | 280/729 |
| 6,834,884 B2 * | 12/2004 | Gu | ............................. | 280/729 |
| 6,866,291 B2 * | 3/2005 | Abe et al. | .................... | 280/729 |
| 6,971,674 B2 * | 12/2005 | Johansson | ................. | 280/743.1 |
| 7,093,854 B2 * | 8/2006 | Fischer et al. | ............. | 280/743.2 |
| 7,111,866 B2 * | 9/2006 | Abe et al. | .................... | 280/729 |
| 7,334,812 B2 * | 2/2008 | Abe | .......................... | 280/729 |
| 7,380,822 B2 * | 6/2008 | Abe | ........................ | 280/743.1 |
| 2003/0020264 A1 * | 1/2003 | Abe et al. | ................... | 280/729 |
| 2003/0107205 A1 * | 6/2003 | Gu | .............................. | 280/729 |
| 2004/0145162 A1 * | 7/2004 | Abe et al. | .................... | 280/729 |

(Continued)

FOREIGN PATENT DOCUMENTS

JP 01-311930 12/1989

(Continued)

*Primary Examiner*—Paul N. Dickson
*Assistant Examiner*—Timothy Wilhelm
(74) *Attorney, Agent, or Firm*—Manabu Kanesaka (57) ABSTRACT

An airbag has a first inner panel and a second inner panel arranged substantially in a concentric relation with a front panel and a rear panel in an interior of an airbag, and outer peripheral edge portions are stitched to each other by a high-strength seam. A center portion of the first inner panel is stitched to a center portion of the front panel by a seam. A center portion of the second inner panel is connected to a center portion of the rear panel by a retaining ring. The second inner panel is formed with a communication port between a first chamber and a second chamber. Midsections of the inner panels between the outer peripheral edge portions and the center portions are connected by a tear seam. The tear seam is adapted to be broken when the pressure in the first chamber reaches a predetermined pressure.

11 Claims, 11 Drawing Sheets

U.S. PATENT DOCUMENTS

2005/0057030 A1* 3/2005 Fischer et al. ............ 280/743.2
2005/0098991 A1* 5/2005 Nagai et al. ............... 280/743.1

FOREIGN PATENT DOCUMENTS

| | | |
|---|---|---|
| JP | 1311930 | 12/1989 |
| JP | 7125586 | 5/1995 |
| JP | 7125587 | 5/1995 |
| JP | 7125588 | 5/1995 |
| JP | 7125589 | 5/1995 |
| JP | 8119052 | 5/1996 |
| JP | 10081191 | 3/1998 |
| JP | 11-321506 | 11/1999 |
| JP | 2005170206 | 6/2005 |

* cited by examiner

AIRBAG AND AIRBAG APPARATUS

BACKGROUND OF THE INVENTION AND RELATED ART STATEMENT

The present invention relates to an airbag provided preferably in a steering wheel of a motor vehicle for being inflated in case of an emergency such as a collision, and for protecting a human body.

In order to protect a passenger in case of an emergency such as the collision of a motor vehicle, various types of airbag apparatus such as an airbag apparatus for a driver's seat are employed. The airbag apparatus for the driver's seat includes an airbag formed by stitching peripheral edge portions of a front panel on the passenger side and a rear panel on the opposite side. The rear panel is provided with a port for engaging an inflator at a center thereof for receiving a distal end side of the inflator. A periphery of the port is mounted to a retainer by bolts, pins, or rivets. The rear panel is formed with a vent hole for releasing gas in the bag and absorbing an impact when the passenger on the driver's seat is displaced into the airbag.

In Japanese Unexamined Patent Application Publication No. 1-311930 and Japanese Unexamined Patent Application Publication No. 10-81191, an airbag including an inner panel (it is referred to as "inner gas bag" in Japanese Unexamined Patent Application Publication No. 1-311930) is provided so as to extend between an inflator port on the rear panel and the front panel, and so that an interior of the airbag is partitioned into a first chamber at a center and a second chamber extending in a periphery thereof. The inner gas bag is provided with a communication port for bringing the first chamber and the second chamber into communication with each other. When the inflator is activated, the first chamber is inflated first, and the second chamber is inflated successively.

Accordingly, it is an object of the present invention to provide an airbag whose interior is divided into a first chamber and a second chamber by an inner panel which is continued from a front panel in which the second chamber is quickly inflated upon inflation of the airbag.

Further objects and advantages of the invention will be apparent from the following description of the invention and the associated drawings.

SUMMARY OF THE INVENTION

An airbag according to one embodiment of the present invention is inflated by gas from a gas generator. The airbag includes a front panel to be arranged on a passenger side; a rear panel arranged on an opposite side from the passenger, the front panel and the rear panel being connected to each other along peripheral edge portions thereof, a port for the gas generator provided at a center of the rear panel; and an inner panel for dividing an interior of the airbag into a first chamber at a center and a second chamber which surrounds the first chamber.

A low-strength connecting means is provided for connecting a part of the inner panel to at least one of the inner panel, the front panel, and the rear panel. The low-strength connecting means maintains the connection to keep capacity of the first chamber relatively small until a gas pressure in the first chamber reaches a predetermined pressure, and releases the connection when the gas pressure in the first chamber exceeds the predetermined pressure to make the capacity of the first chamber relatively large.

In another embodiment, the airbag is configured in such a manner that the inner panel includes a first inner panel on the front panel side and a second inner panel on the rear panel side. A center portion or a portion in the vicinity thereof of the first inner panel is connected to the front panel, and a peripheral edge portion of the first inner panel is connected to a peripheral edge portion of the second inner panel by connecting means. A center portion of the second inner panel is formed with a port which is to be arranged substantially in a concentric relation with the port of the rear panel. The connecting means includes low-strength first connecting means for connecting the first inner panel and the second inner panel so as to keep the capacity of the first chamber relatively small until the gas pressure in the first chamber reaches the predetermined pressure, and high-strength second connecting means for connecting the first inner panel and the second inner panel so as to make the capacity of the first chamber relatively large. The first connecting means releases connection when the gas pressure in the first chamber exceeds the predetermined pressure.

In another embodiment, the airbag is configured in such a manner that the inner panel includes a first inner panel on the front panel side and a second inner panel on the rear panel side. A center portion or a portion in the vicinity thereof of the first inner panel is connected to the front panel, and a peripheral edge portion of the first inner panel is connected to a peripheral edge portion of the second inner panel by connecting means. A center portion of the second inner panel is formed with a port which is to be arranged substantially in a concentric relation with the port of the rear panel. Part of the first inner panel is connected to the front panel by the low-strength connecting means so as to reduce the capacity of the first chamber, and the low-strength connecting means releases the connection when the gas pressure in the first chamber exceeds the predetermined pressure.

In another embodiment, the airbag is configured in such a manner that the inner panel includes a first inner panel on the front panel side and a second inner panel on the rear panel side. A center portion or a portion in the vicinity thereof of the first inner panel is connected to the front panel, and a peripheral edge portion of the first inner panel is connected to a peripheral edge portion of the second inner panel by connecting means. A center portion of the second inner panel is formed with a port which is to be arranged substantially in a concentric relation with the port of the rear panel. Part of the second inner panel is connected to the rear panel by the low-strength connecting means so as to reduce the capacity of the first chamber. The low-strength connecting means releases the connection when the gas pressure in the first chamber exceeds the predetermined pressure.

In another embodiment, the airbag is configured in such a manner that the inner panel is formed of a single panel, and a peripheral edge portion or a portion in the vicinity thereof of the inner panel is connected to the front panel by connecting means. A center portion of the inner panel is formed with a port which is to be arranged substantially in a concentric relation with the port of the rear panel. The connecting means includes low-strength first connecting means for connecting the inner panel and the front panel so as to keep the capacity of the first chamber relatively small until the gas pressure in the first chamber reaches the predetermined pressure, and high-strength second connecting means for connecting the inner panel and the front panel so as to make the capacity of the first chamber relatively large. The first connecting means releases connection when the gas pressure in the first chamber exceeds the predetermined pressure.

In another embodiment of the invention, the first connecting means is provided so as to turn around the first chamber a multiple number of times.

In another embodiment of the invention, the first connecting means is provided so as to extend in a spiral manner.

According to another embodiment of the invention, an airbag apparatus includes an airbag and a gas generator having a gas injection port. The gas generator is arranged within the airbag at least on a distal end side thereof, and the gas injection port is arranged in the airbag, wherein the airbag is the airbag according to the present invention.

According to the airbag and the airbag apparatus of the present invention, when the airbag is inflated, the first chamber is inflated first, and then the second chamber is inflated by gas from the first chamber. The interior of the first chamber has a relatively small capacity until the pressure therein reaches the predetermined pressure, and gas from the gas generator quickly flows into the second chamber. Therefore, inflation of the second chamber in an early stage is achieved. When the second chamber is sufficiently inflated, the gas pressure in the first chamber is increased. When the gas pressure in the first chamber reaches the predetermined pressure, connection of the low-strength connecting means is released and hence the first chamber is expanded, whereby the airbag is inflated to the final deployed shape.

A tear seam is simple and suitable for the low-strength connecting means.

In the present invention, it is preferable to configure the inner panel with the first inner panel on the side of the front panel and the second inner panel on the side of the rear panel connected to each other. In this arrangement, the size of the first inner panel is adjusted, thereby easily achieving a design in which the thickness or the shape of the airbag can be adjusted. In this case, the first inner panel and the front panel may be connected with the low-strength connecting means, the first inner panel and the second inner panel are connected by the low-strength connecting means, and the second inner panel and the rear panel may be connected by the low-strength connecting means.

In the present invention, the inner panel may be configured of a single panel. In this arrangement, manufacture (for example, stitching) is facilitated. In this case, the inner panel is connected by the low-strength first connecting means to the front panel, and the capacity of the first chamber until the gas pressure in the first chamber reaches the predetermined pressure is adjusted when the airbag is inflated.

By providing the first connecting means so as to turn around the first chamber by multiple times, expansion of the first chamber in association with release of the connection of the first connecting means can be performed gradually.

When the first connecting means is formed into a spiral shape, release of connection can be started from an inner peripheral end of the spiral and propagated toward an outer peripheral end continuously.

DETAILED DESCRIPTION OF THE PREFERRED EMBODIMENTS

Referring now to the drawings, embodiments of the present invention will be described.

Figure 1:
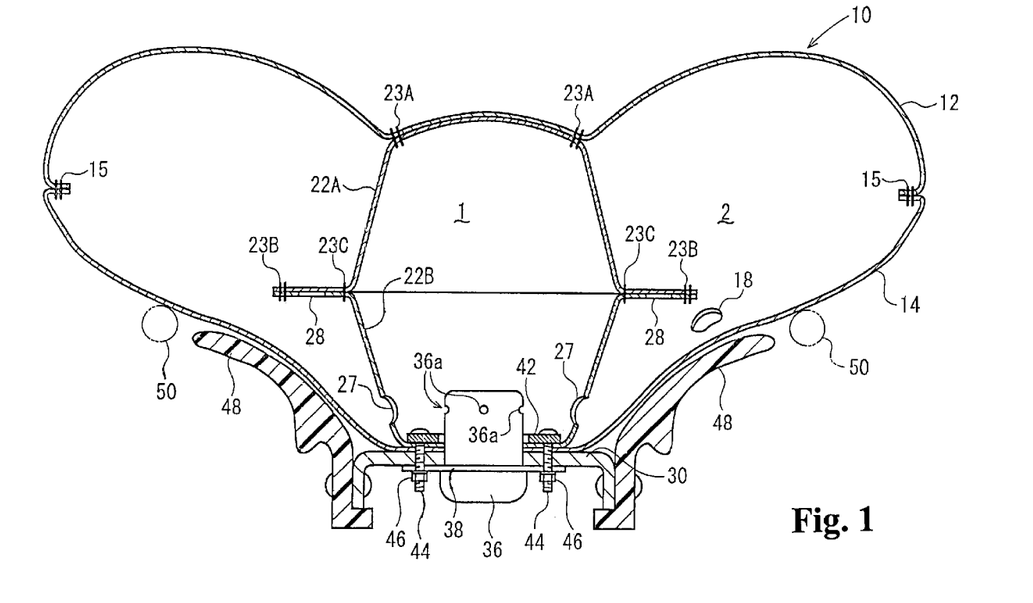
FIG. 1 is a cross-sectional view of an airbag and an airbag apparatus according to one embodiment of the invention when the airbag is in a course of inflation.
Figure 2:
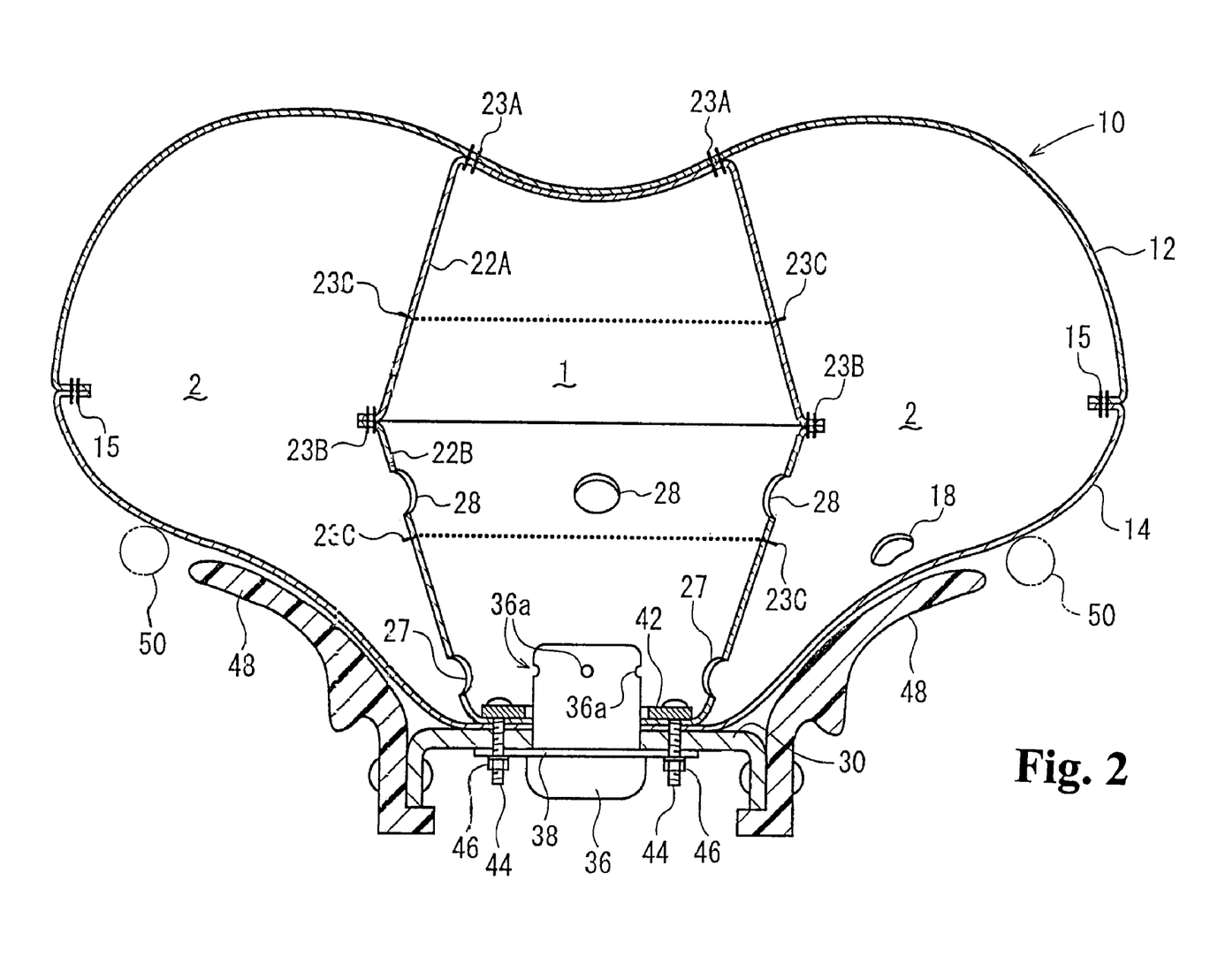
FIG. 2 is a cross-sectional view of the airbag and the airbag apparatus shown in FIG. 1 after the airbag has completely inflated.
Figure 3:
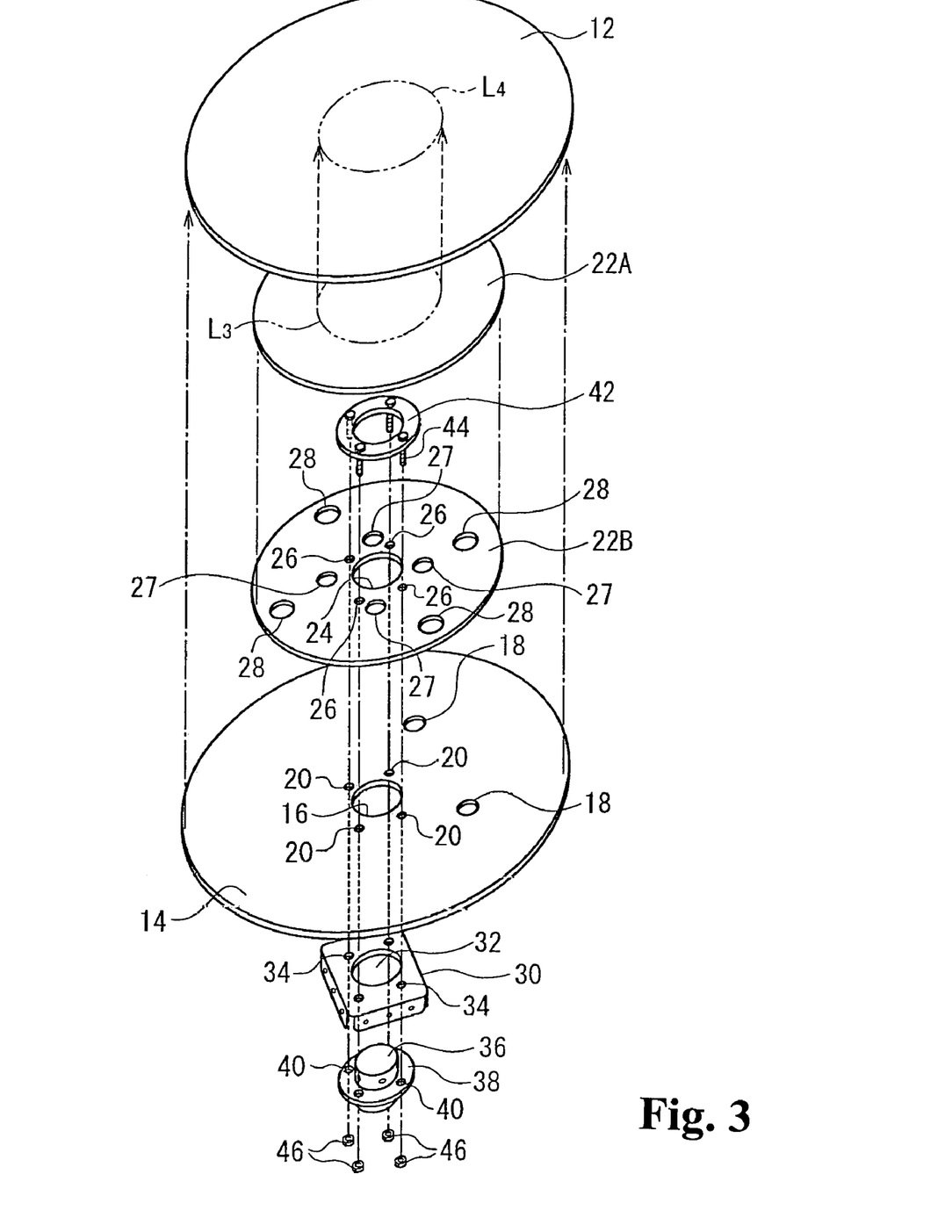
FIG. 3 is an exploded perspective view of the airbag and the airbag apparatus shown in FIG. 1.
Figure 4:
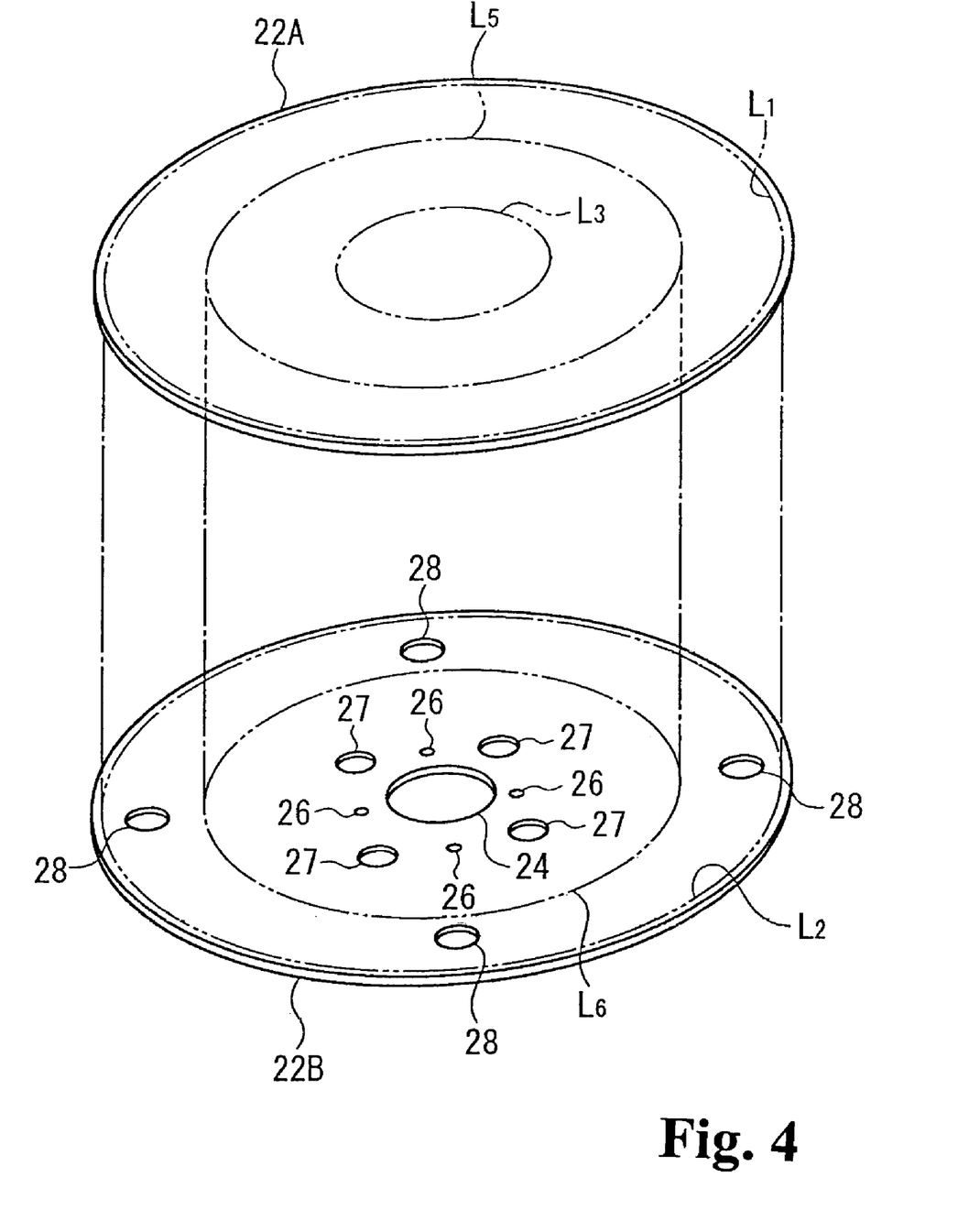
FIG. 4 is an exploded perspective view of a first inner panel and a second inner panel of the airbag shown in FIG. 1.

FIG. 1 and FIG. 2 are cross-sectional views of an airbag and an airbag apparatus for a driver's seat of a motor vehicle according to one embodiment of the invention. FIG. 1 shows the airbag in a course of inflation, and FIG. 2 shows the airbag after having completely inflated. FIG. 3 is an exploded perspective view of the airbag and the airbag apparatus, and FIG. 4 is an exploded perspective view showing a connecting structure of a first inner panel and a second inner panel.

An airbag 10 includes a front panel 12, a rear panel 14 a first inner panel 22A, and a second inner panel 22B, each being formed of woven cloth in a substantially circular shape. The front panel 12 and the rear panel 14 have the same diameter, and are formed into a bag shape by being stitched along outer peripheral edge portions thereof with each other by a seam 15 of a thread or the like. A stitched portion has an annular shape extending around outer peripheries of the front panel 12 and the rear panel 14. The seam 15 is a high-strength seam which is not broken even when a pressure in the airbag 10 exceeds a predetermined pressure (that is, which does not release the connection between the panels 12 and 14).

The rear panel 14 is provided with an inflator port 16 (gas generator) and a vent hole 18. The inflator port 16 is arranged at a center of the rear panel 14. Bolt insertion holes 20 are provided around the inflator port 16.

The first inner panel 22A and the second inner panel 22B are provided within the airbag 10. The first and second inner panels 22A, 22B are arranged substantially in a concentric relation with the front panel 12 and the rear panel 14, and outer peripheral edge portions thereof are stitched with each other by a seam 23B of a thread or the like. The interior of the airbag 10 is partitioned into a first chamber 1 at a center, and a second chamber 2 which surrounds the first chamber 1 by the first and the second inner panels 22A and 22B. The first chamber 1 is located on the inside of the inner panels 22A, 22B.

A center portion of the first inner panel 22A on the side of the front panel 12 (a portion on a distal side of the inner panel 22A in a state in which the airbag 10 is inflated) is stitched to a center portion of the front panel 12 with a seam 23A of a thread or the like.

As shown in FIGS. 3 and 4, the seam 23B connects the inner panels 22A, 22B with respect to each other along annular stitching (connecting) lines $L_1$, $L_2$ which extend along the outer peripheral edge portions of the respective inner panels 22A, 22B. The seam 23A connects the inner panel 22A and the front panel 12 along annular stitching lines $L_3$, $L_4$ which extend along the center portion of the inner panel 22A and the center portion of the front panel 12, respectively. These seams 23B, 23A are high-strength seams that do not release the connection between the panels 22A and 22B, and between the panels 22A and 12 even when the interior of the first chamber 1 reaches a predetermined pressure.

In this embodiment, midpoints between the outer peripheral edge portions and the center portions of the inner panels 22A, 22B are stitched by a tear seam 23C. As shown in FIG. 3, in this embodiment, the tear seam 23C connects the inner panels 22A, 22B with each other along annular stitching lines $L_5$, $L_6$ which extend along the portion between the outer peripheral edge portions and the center portions of the respective inner panels 22A, 22B (inside the stitching lines $L_1$, $L_2$ and outside of the stitching line $L_3$). The tear seam 23C is a low-strength seam which is broken when the pressure in the interior of the first chamber 1 exceeds the predetermined pressure to release the connection between the panels 22A, 22B.

With the tear seam 23C, the interior of the first chamber 1 is relatively small in capacity until the inner pressure reaches the predetermined pressure.

In other words, in this embodiment, the tear seam 23C corresponds to low-strength first connecting means which connects the first inner panel 22A and the second inner panel 22B so that the capacity of the first chamber 1 is kept small until the gas pressure in the first chamber 1 reaches the predetermined pressure, and the seam 23B corresponds to second connecting means which connects the first inner panel 22A and the second inner panel 22B so that the capacity of the first chamber 1 is increased.

At a center portion of the second inner panel 22B on the side of the rear panel 14 (at a portion on the rear end side of the second inner panel 22B in a state in which the airbag 10 is inflated), there is provided an inflator port 24 which is arranged substantially in a concentric relation with the inflator port 16 on the rear panel 14. These ports 16, 24 are substantially circular shape. Bolt insertion holes 26 which is overlapped with the bolt insertion holes 20 of the rear panel 14 are provided around the port 24 of the inner panel 22B.

The second inner panel 22B is provided with a plurality of communication ports 27, 28. The communication port 28 is arranged in an area between the stitching lines $L_2$ and $L_6$ (that is, between the seam 23B and the tear seam 23C), and the communication port 27 is arranged on an inner peripheral side therefrom. Therefore, the communication port 28 is kept in a closed state until the pressure in the first chamber 1 reaches the predetermined pressure, and hence the tear seam 23C is broken. The communication port 28 may be provided in an area on the first inner panel 22A between the stitching lines $L_1$, $L_5$.

In this embodiment, the communication port 27 is formed on an extension of a direction of gas injection from an inflator 36, described later, arranged in the first chamber 1, that is, at a position which opposes a gas injection port 36a of the inflator 36, via the inflator ports 16, 24.

In this embodiment, as shown in FIG. 2, the communication ports 27, 28 are provided four each at regular intervals in a direction of the circumference of the airbag. These communication ports 27, 28 are shifted in circumferential phase with respect to a center of the airbag.

It is also possible to provide reinforcing patches at the peripheral edge portions of the ports 16, 24, the communication ports 27, 28, and the vent hole 18.

A retainer 30 for mounting the airbag 10 is provided with an inflator mounting port 32 at a center thereof, and bolt insertion holes 34 therearound.

The inflator 36 has substantially a columnar shape, and is provided with the gas injection ports 36a on a side peripheral surface on a distal side in an axial direction. In this embodiment, the gas injection ports 36a are provided at four positions at regular intervals in a circumferential direction of the inflator 36. The inflator 36 is adapted to inject gas from the gas injection ports 36a in radial directions. A flange 38 for fixing the inflator is provided so as to project from the side peripheral surface of the inflator 36 at a midsection in the axial direction (rear end side with respect to the gas injection ports 36a). The flange 38 is provided with bolt insertion holes 40. The inflator 36 is fitted into the inflator mounting port 32 on the retainer 30 at the distal end side thereof.

When mounting the airbag 10 to the retainer 30, the peripheral edge portion of the inflator port 24 of the second inner panel 22B is overlapped with the peripheral edge portion of the inflator port 16 of the rear panel 14, and then overlapped with the peripheral edge portion of the inflator mounting port 32 of the retainer 30.

The second inner panel 22B, the airbag 10, and the inflator 36 are fixed to the retainer 30 by inserting stud bolts 44 of a retaining ring 42 into the respective bolt insertion holes 26, 20, 34 and 40 of the second inner panel 22B, the rear panel 14, the retainer 30, and the flange 38, and tightening nuts 46 at distal ends thereof. Then, the airbag apparatus is formed by folding the airbag 10 and mounting a module cover 48 to the retainer 30 so as to cover a folding body of the airbag 10. The airbag apparatus is installed in a steering wheel 50 of a motor vehicle.

Upon collision of the vehicle on which the airbag apparatus configured in this manner is mounted, the inflator 36 is activated and gas is injected within the airbag 10. The airbag 10 is inflated by this gas, pushes and opens the module cover 48, and is deployed in a cabin.

In this airbag 10, the first chamber 1 is inflated first, then gas in the first chamber 1 flows into the second chamber 2 through the communication port 27, and then the second chamber 2 is inflated. In this case, since the first chamber 1 is kept in a state in which the capacity is reduced by the tear seam 23C until the pressure in the first chamber reaches the predetermined pressure as shown in FIG. 1, the gas can flow into the second chamber 2 quickly from the interior of the first chamber 1. Accordingly, inflation of the second chamber 2 is achieved in an early stage.

When the second chamber 2 is inflated sufficiently, the internal pressure of the first chamber 1 is increased. Then, when the internal pressure reaches a predetermined pressure, the tear seam 23C is broken, and the first chamber 1 is enlarged, whereby the airbag 10 is inflated to a final (maximum) deployed shape as shown in FIG. 2. By the tear seam 23C being broken, the communication ports 28 are brought into an opened state.

When a passenger hits against the inflated airbag 10, the gas in the interiors of the first chamber 1 and the second chamber 2 flows out through the communication ports 28 or the vent holes 18, thereby absorbing impact.

In this airbag 10, since the communication ports 27 which bring the first chamber 1 and the second chamber 2 into communication with each other are arranged on an extension of the direction of the gas injection from the inflator 36 arranged in the first chamber 1, that is, at the position which opposes the gas injection port 36a of the inflator 36, when the inflator 36 is activated, gas is injected from the gas injection port 36a toward the communication ports 27. Therefore, the gas from the inflator 36 can easily flow into the second chamber 2 through the communication ports 27. Accordingly, the inflation of the second chamber 2 is achieved in an earlier stage of deployment.

Although the tear seam 23C has an annular shape extending along the midsection between the outer peripheral edge portions and the center portions of the respective inner panels 22A, 22B in this embodiment, the configuration of the tear seam is not limited thereto.

Figure 5:
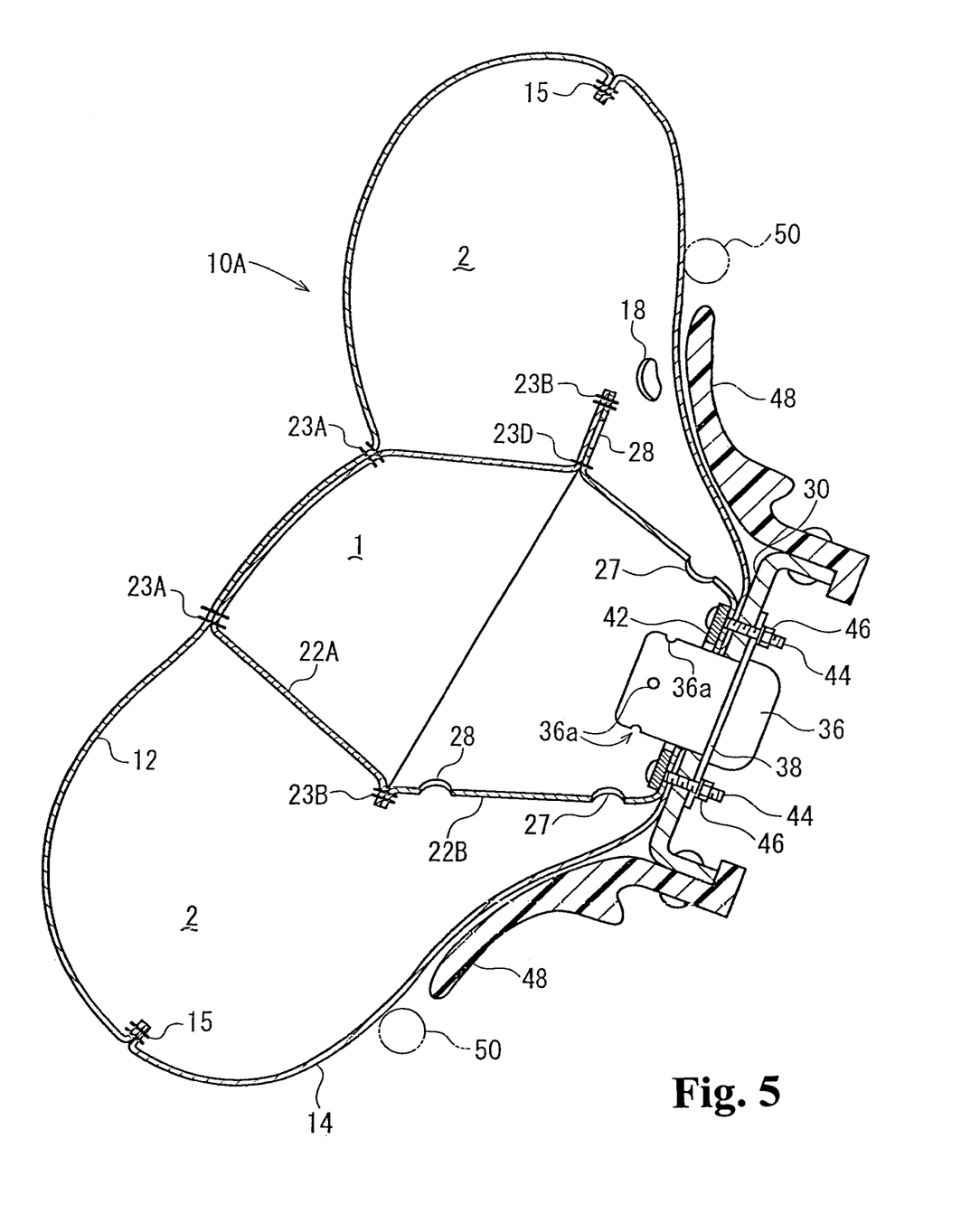
FIG. 5 is a cross-sectional view of an airbag and an airbag apparatus according to another embodiment of the invention when the airbag is in a course of inflation.

FIG. 5 is a cross-sectional view of an airbag and an airbag apparatus showing another configuration of a tear seam.

In an airbag 10A of this embodiment, the first inner panel 22A and the second inner panel 22B are stitched together by a tear seam 23D partly at midsections between the outer peripheral edge portions (seam 23B) and the center portions (seam 23A) of respective inner panels 22A, 22B on sides which come on upper sides of the center portions of the respective inner panels 22A and 22B when the steering wheel 50 of the motor vehicle on which the airbag apparatus is installed assumes a straight-ahead steering position (hereinafter, the term "vertical direction" means the vertical direction in this state). This tear seam 23D is also broken when the gas pressure in the first chamber 1 exceeds the predetermined pressure to release the mutual connection between the inner panels 22A, 22B.

Other configurations of the airbag 10A are the same as those of the airbag 10 shown in FIG. 1 to FIG. 4, and the identical reference numbers in FIGS. 1 to 4 as those in FIG. 5 represent the same identical parts.

In the airbag 10A, when the inflator 36 is activated to inject gas upon collision of the vehicle, and the airbag 10A is inflated, the first chamber 1 is kept in a state in which the capacity is reduced by the tear seam 23D until the pressure in the first chamber 1 reaches the predetermined pressure. Therefore, the gas is allowed to flow quickly from the interior of the first chamber 1 into the second chamber 2 through the communication ports 27. Accordingly, inflation of the second chamber 2 is achieved in an early stage.

Since the deployment of the airbag 10A is constrained on upper sides of the center portions of the inner panels 22A and 22B by the tear seam 23D, inflation of an upper portion of the second chamber 2 is also constrained. Therefore, the second chamber 2 is inflated quickly in a lower portion thereof as shown in FIG. 5, so that an abdominal portion or a chest portion of the passenger is received in an early stage.

When the second chamber 2 is inflated sufficiently thereafter, the pressure in the first chamber 1 is increased. Then, when the internal pressure reaches the predetermined pressure, the tear seam 23D is broken and the upper portions of the first chamber 1 and the second chamber 2 are expanded, whereby the airbag 10A is inflated to the final (maximum) shape.

Figure 6:
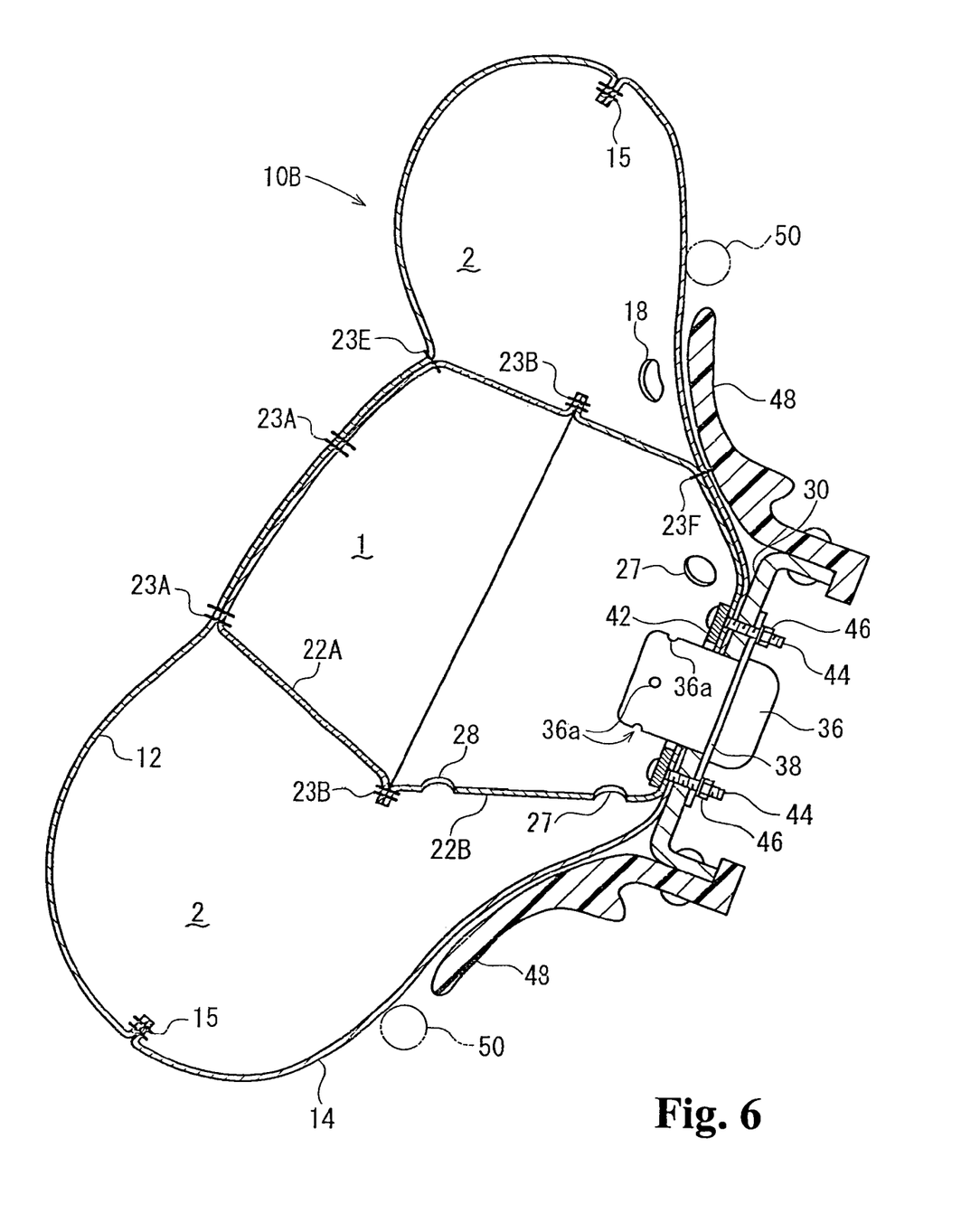
FIG. 6 is a cross-sectional view of an airbag and an airbag apparatus according to another embodiment of the invention when the airbag is in a course of inflation.

FIG. 6 is a cross-sectional view of an airbag and an airbag apparatus according to another embodiment of the invention when the airbag is in a course of inflation.

In an airbag 10B of this embodiment, a midsection between the outer peripheral edge portion (seam 23B) and the center portion (seam 23A) of the first inner panel 22A is stitched to the front panel 12 by a tear seam 23E. Also, a midsection between the outer peripheral edge portion (seam 23B) and the center portion (inflator port 24) of the second inner panel 22B is stitched to the rear panel 14 by a tear seam 23F. The tear seams 23E, 23F connect the inner panels 22A, 22B partly to the front panel 12 and the rear panel 14 on the sides which come on the upper sides of the center portions of the respective inner panels 22A, 22B when the steering wheel 50 of the motor vehicle on which the airbag apparatus is installed assumes a straight-ahead steering position.

These tear seams 23E, 23F are also broken when the gas pressure in the first chamber 1 exceeds the predetermined pressure, and release connection between the first inner panel 22A and the front panel 12 and connection between the second inner panel 22B and the rear panel 14.

Therefore, in this airbag 10B as well, deployment of the inner panels 22A, 22B on the upper side from the center portion is constrained by the tear seams 23E, 23F until the gas pressure in the first chamber 1 reaches the predetermined pressure, whereby the expansion of the upper portions of the first chamber 1 and the second chamber 2 is constrained.

The airbag 10B has the same configuration as the above-described airbag 10 of FIGS. 1 to 3 other than the fact that the first inner panel 22A and the second inner panel 22B are connected to the front panel 12 and the rear panel 14 by the tear seams 23E, 23F.

In this airbag 10B as well, when the inflator 36 is activated to inject gas upon collision of the vehicle, and the airbag 10B is inflated, the first chamber 1 is kept in a state in which the capacity is reduced by the tear seams 23E, 23F until the pressure in the first chamber 1 reaches the predetermined pressure. Therefore, the gas is allowed to flow quickly from the interior of the first chamber 1 into the second chamber 2 through the communication ports 27. Accordingly, inflation of the second chamber 2 is achieved in an early stage.

Since the deployment of the airbag 10B is constrained on the upper side of the second chamber 2 as well, the second chamber 2 is inflated quickly in the lower portion thereof as shown in FIG. 6, so that the abdominal portion or the chest portion of the passenger is received in an early stage.

When the second chamber 2 is inflated sufficiently thereafter, the pressure in the first chamber 1 is increased. Then, when the internal pressure reaches the predetermined pressure, the tear seams 23E, 23F are broken, and the upper portions of the first chamber 1 and the second chamber 2 are expanded, whereby the airbag 10B is inflated to the final (maximum) shape.

The respective embodiments described above only show examples of the present invention, and the present invention is not limited to the above-described embodiments.

For example, in the above-described embodiments, the tear seam is applied as the low-strength connecting means for constraining deployment of the first inner panel and the second inner panel. However, the low-strength connecting means may be other forms. For example, it is also possible to connect the panels with low-adhesive bonding agent, so that the bonding agent is separated when the pressure in the first chamber 1 exceeds the predetermined pressure, thereby releasing constraint of the respective inner panels.

The low-strength connecting means may be arranged at a portion other than those shown in the drawings.

In the above-described embodiments, four each of the gas injection ports 36a and the communication ports 27 are provided. However, the number is not limited to four. Although the communication ports 27 are arranged on the directions of extensions of all the gas injection ports 36a of the inflator 36 in the embodiments described above, the communication ports 27 may be arranged only on the directions of extensions of some of the gas injection ports 36a. It is also possible to arrange some of the communication ports at positions shifted from the directions of extensions of the gas injection ports 36a, and hence there exist communication ports which do not oppose to the gas injection ports 36a.

In the present invention, it is also possible to provide a rectifying cloth in the interior of the first chamber 1 so that the gas from the inflator is guided to the communication ports 27.

Figure 7:
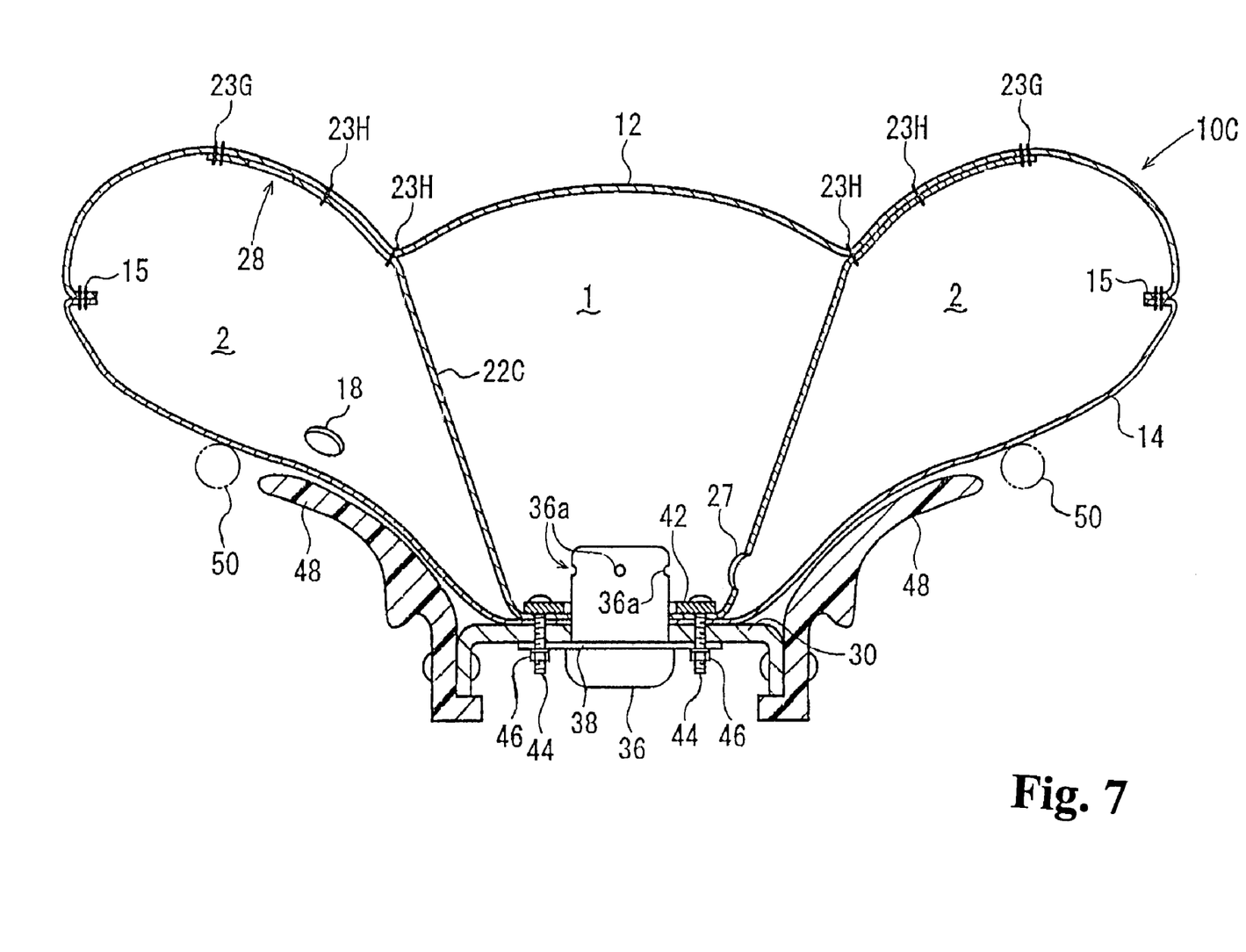
FIG. 7 is a cross-sectional view of an airbag and an airbag apparatus according to another embodiment of the invention when the airbag is in a course of inflation.
Figure 8:
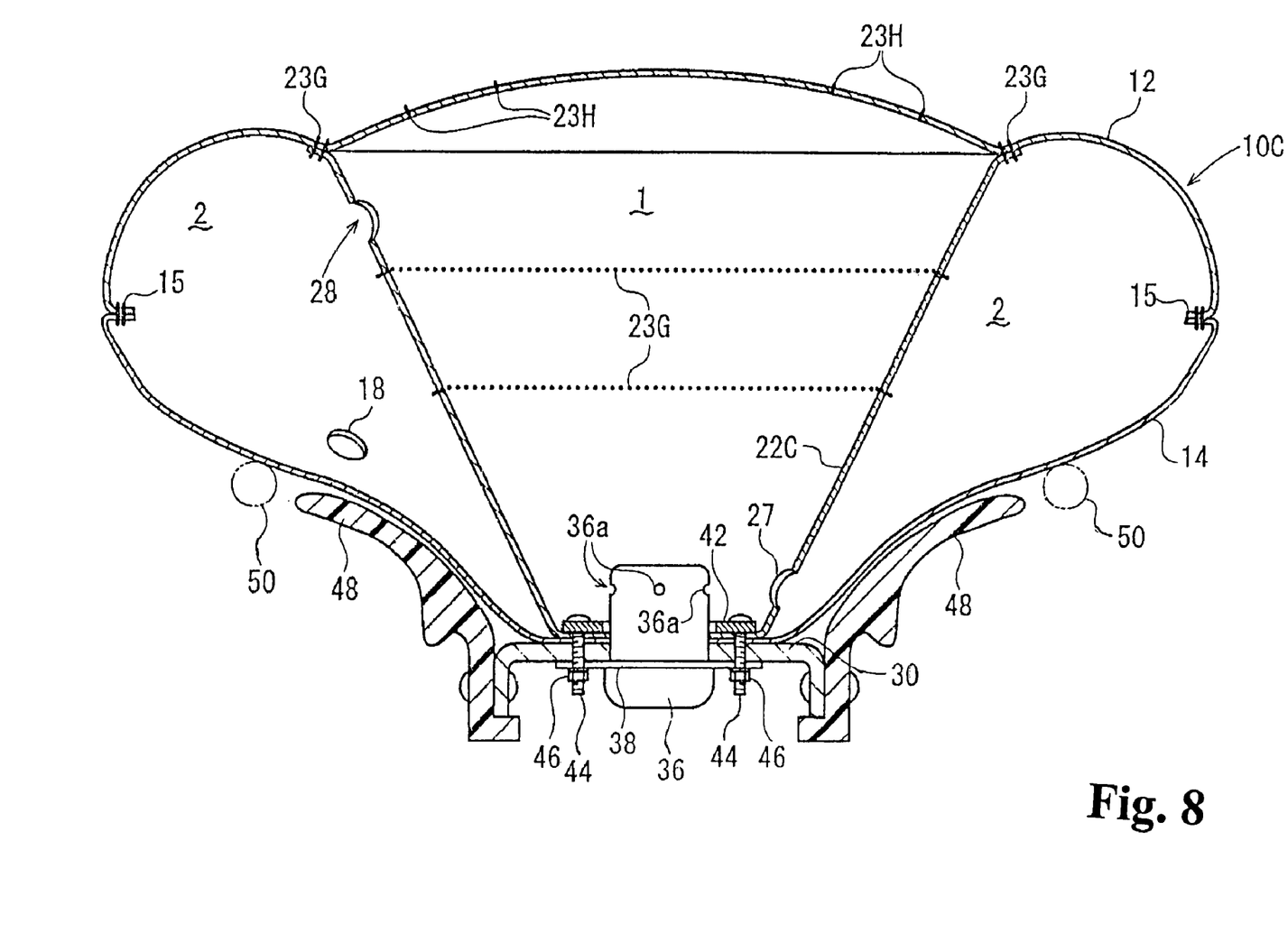
FIG. 8 is a cross-sectional view of the airbag and the airbag apparatus shown in FIG. 7 after the airbag has completely inflated.
Figure 9:
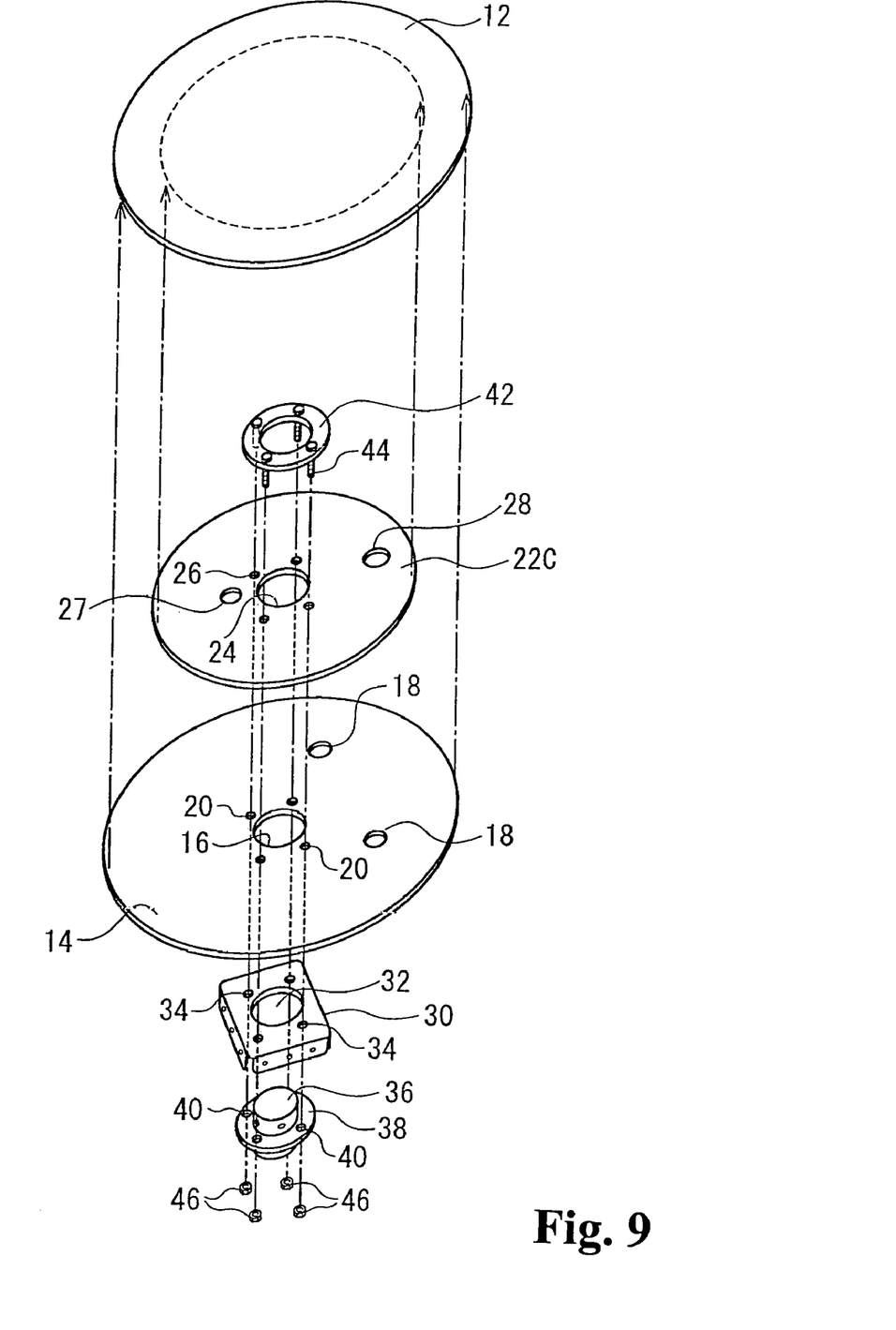
FIG. 9 is an exploded perspective view of the airbag and the airbag apparatus shown in FIG. 7.
Figure 10:
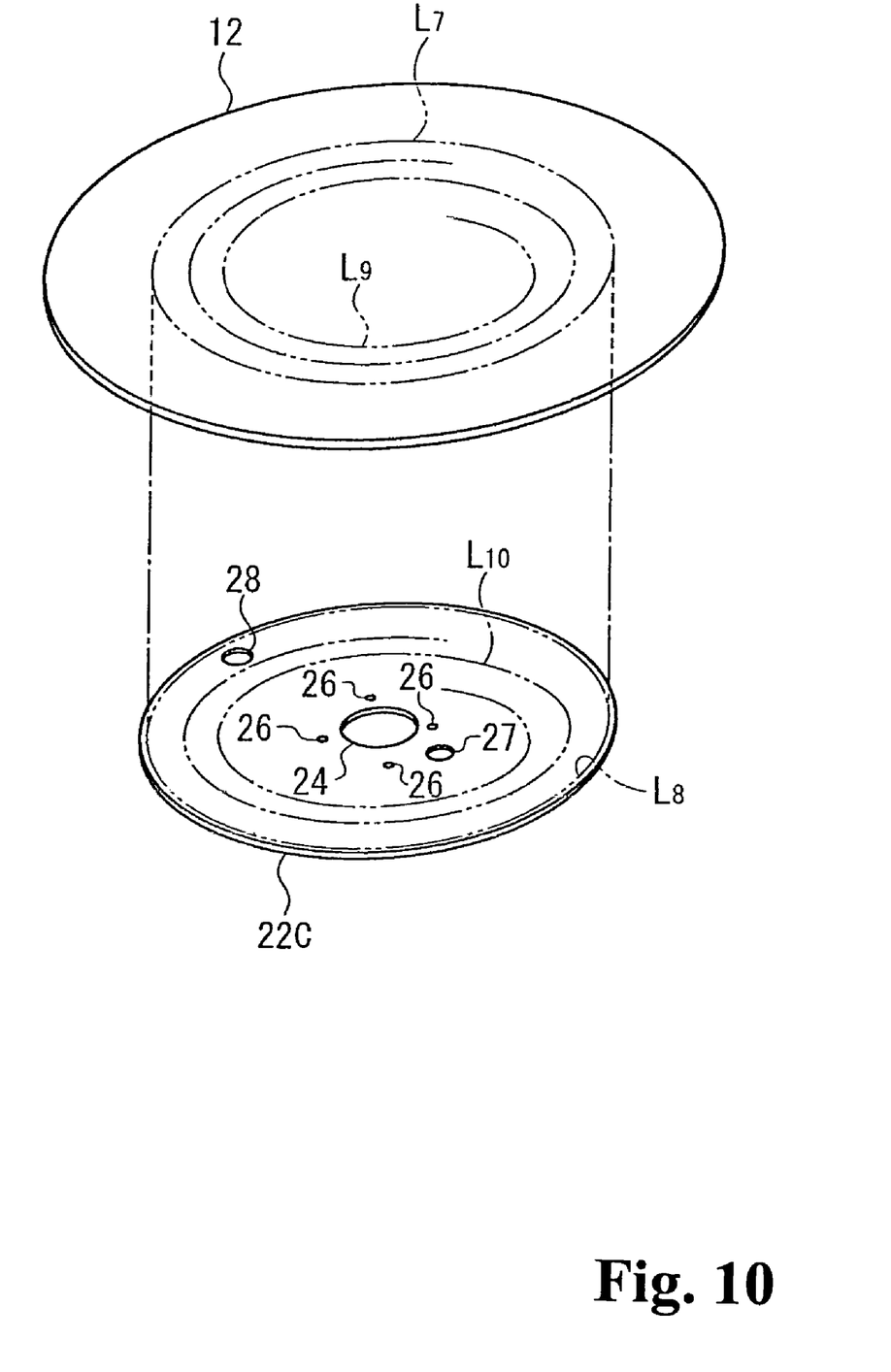
FIG. 10 is an exploded perspective view of a front panel and an inner panel of the airbag shown in FIG. 7.
Figure 11:
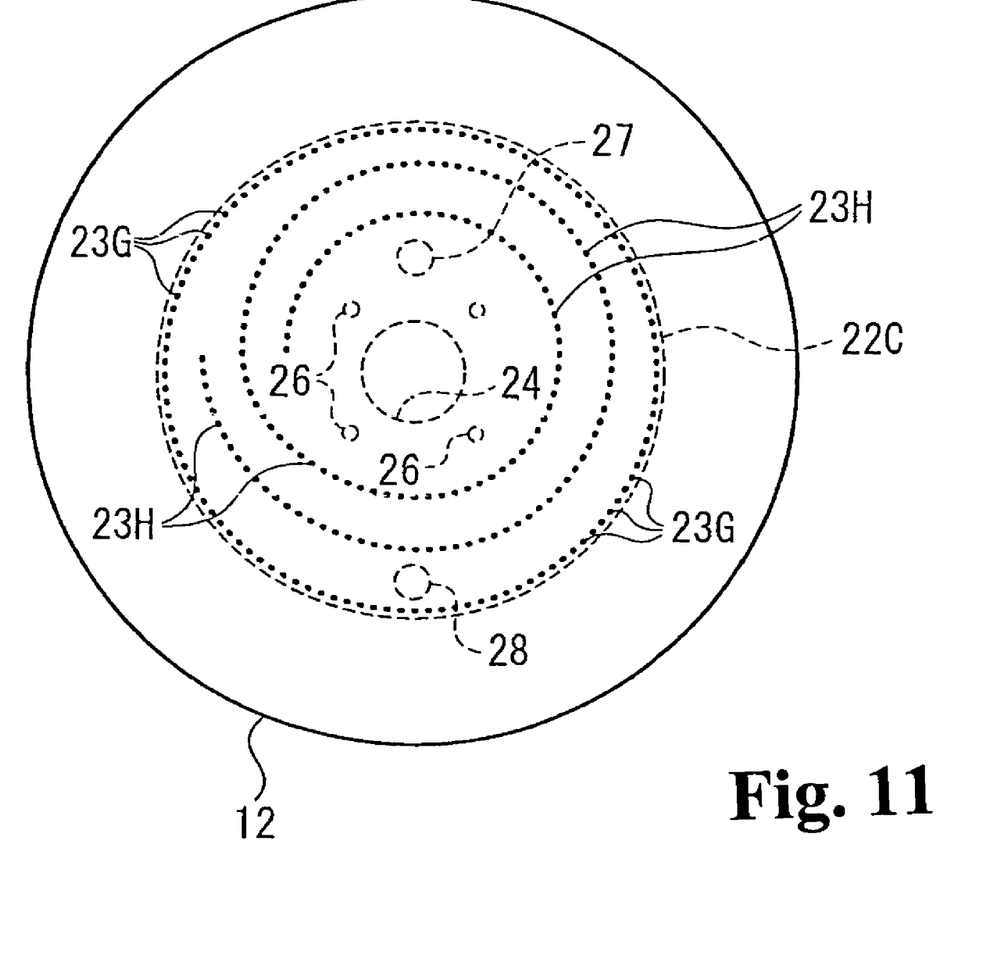
FIG. 11 is a front view of the airbag shown in FIG. 7.

In the respective embodiments described above, the inner panel is composed of two continuous panels including the first inner panel and the second inner panel. However, it may be composed of a single panel. FIG. 7 and FIG. 8 are cross-sectional views of an airbag and an airbag apparatus for the driver's seat of a motor vehicle configured in this manner. FIG. 7 shows the airbag in a course of inflation, and FIG. 8 shows the airbag after having completely inflated. FIG. 9 is an exploded perspective view of the airbag and the airbag apparatus; FIG. 10 is an exploded perspective view showing a connecting structure of the front panel and the inner panel of the airbag; and FIG. 11 is a front view of this airbag.

An airbag 10C of this embodiment includes the front panel 12, the rear panel 14 and an inner panel 22C each formed of woven cloths in a substantially circular shape. In this embodiment as well, the airbag 10C is formed into a bag shape by being stitched along the outer peripheral edge portions of the front panel 12 and the rear panel 14 with each other by the high-strength seam 15, and the interior is partitioned into the first chamber 1 at the center and the second chamber 2 which surrounds the first chamber 1 by providing the inner panel 22C in the interior thereof. The structures of the front panel 12 and the rear panel 14 are the same as those in the respective embodiments described above.

The inner panel 22C is arranged substantially in a concentric relation with the front panel 12 and the rear panel 14, and an outer peripheral edge thereof is stitched to a portion near the midsection between the center portion and the peripheral portion of the front panel 12 by a seam 23G. Reference characters $L_7$, $L_8$ in FIG. 10 show lines to be stitched by the seam 23G. As shown in the drawing, a stitching portion by the seam 23G has an annular shape extending along the outer periphery of the inner panel 22C. The seam 23G is a high-strength seam which is not broken even when the interior of the first chamber 1 exceeds the predetermined pressure.

As shown in FIG. 9, the inflator port 24 to be arranged substantially in the concentric relation with the inflator port 16 of the rear panel 14 is provided at a center portion of the inner panel 22C, and the bolt insertion holes 26 to be overlapped with the bolt insertion holes 20 of the rear panel 14 are provided around the port 24.

In this embodiment, the peripheral edge portion of the inflator port 24 of the inner panel 22C is superimposed with the peripheral edge portion of the inflator port 16 of the rear panel 14, and then superimposed with the peripheral edge portion of the inflator mounting port 32 of the retainer 30. Then, the peripheral edge portions of the inflator ports 24, 16 are fixed to the retainer 30 through the bolt insertion holes 26, 20. Accordingly, the peripheral edge portion of the inflator port 24 of the inner panel 22C is connected to the peripheral edge portion of the inflator port 16 of the rear panel 14, and the outer peripheral edge portion of the inner panel 22C is connected to the front panel 12 by the seam 23. The inside of the inner panel 22C corresponds to the first chamber 1.

The inner panel 22C is provided with the communication ports 27, 28. The communication port 28 is arranged at the position relatively close to the outer peripheral edge of the inner panel 22C, and the communication port 27 is arranged on the inner peripheral side (on the side of the port 24) thereof.

As shown in FIG. 9, in this embodiment, one each of the communication ports 27, 28 is provided. Ports 27, 28 are arranged in a positional relationship opposite from each other across the port 24. However, the number and arrangement of the communication ports 27, 28 are not limited thereto.

In this embodiment, a portion of the inner panel 22C on the outer peripheral side with respect to the midsection between the outer peripheral edge portion and the port 24 is superimposed with the front panel 12, and is stitched by a tear seam 23H as the low-strength connecting means. The tear seam 23H is a low-strength seam which is broken when the pressure in the first chamber 1 exceeds the predetermined pressure. Reference characters $L_9$, $L_{10}$ in FIG. 10 represent lines to be stitched by the tear seam 23H.

As shown in FIG. 10 and FIG. 11, in this embodiment, the tear seam 23H has a spiral shape which extends from the center side to the outer peripheral side of the inner panel 22C while increasing in diameter and turning around the port 24 a multiple number of times.

As shown in the drawing, the communication port 27 is located on the inner peripheral side of the inner panel 22C with respect to the tear seam 23H.

By this tear seam 23H, the first chamber 1 is kept in reduced capacity until the internal pressure thereof reaches the predetermined pressure. The communication port 28 is kept in a closed state until the tear seam 23H is broken.

Other configurations of the airbag 10C and the airbag apparatus provided with the airbag 10C are the same as those in the embodiment shown in FIGS. 1 to 4, and the identical reference numbers in FIGS. 7 to 11 as those in FIGS. 1 to 4 represent the identical parts.

In the airbag 10C as well, when the inflator 36 is activated to inject gas, the first chamber 1 is inflated first by the gas, and then the gas flows into the second chamber 2 through the communication port 27, whereby the second chamber 2 is inflated. At this time, since the first chamber 1 is kept in a state in which the capacity is reduced by the tear seam 23H until the pressure in the first chamber 1 reaches the predetermined pressure as shown in FIG. 7, the gas is allowed to flow quickly from the first chamber 1 to the second chamber 2. Accordingly, inflation of the second chamber 2 in an early stage is achieved.

When the second chamber 2 is sufficiently inflated, the internal pressure in the first chamber 1 is increased. Then, when the internal pressure reaches the predetermined pressure, the tear seam 23H is broken, and hence the first chamber 1 is expanded, whereby the airbag 10C is inflated to the final (maximum) deployed shape shown in FIG. 8. By breakage of the tear seam 23H, the communication port 28 is brought into an opened state.

The breakage of the tear seam 23H starts from an inner peripheral end of the spiral and is propagated toward an outer peripheral end continuously. Therefore, the capacity of the first chamber 1 increases gradually with propagation of breakage. Therefore, in comparison with the case in which the entire tear seam 23H is broken substantially at once, and the capacity of the first chamber 1 is abruptly increased, an impact applied to the seam 15 or the seam 23G when it assumes the maximum deployed shape is alleviated.

When the passenger hits against the inflated airbag 10C, the gas in the interiors of the first chamber 1 and the second chamber 2 flows through the communication port 28 or the vent hole 18, whereby the impact is absorbed.

Although the midsection between the inner peripheral side and the outer peripheral side of the inner panel 22C is stitched to the front panel 12 via the tear seam to reduce the capacity of the first chamber 1 in the embodiment shown in FIG. 7 to FIG. 11, the capacity of the first chamber 1 may be reduced by stitching the midsection between the inner peripheral side and the outer peripheral side of the inner panel 22C to the rear panel 14 with a tear seam.

Although the tear seam 23H has a spiral shape in the above-described embodiment shown in FIG. 7 to FIG. 11, it may be a single annular shape, or a double concentric annular shape.

Although not shown, in the embodiment from FIG. 1 to FIG. 4, the tear seam 23C may be two or more concentric seams, or may be a spiral shape. In the embodiment shown in FIGS. 5 and 6, multiple tear seams 23D may be provided.

It is also possible to provide tear seams from the center side to the outer peripheral side of the inner panel in the radial direction. In this arrangement as well, when the pressure in the first chamber 1 exceeds the predetermined pressure, breakage of the tear seam is continuously propagated from the center side to the outer peripheral side of the inner panel, whereby the capacity of the first chamber increases gradually.

While the invention has been described with reference to specific embodiments thereof, the description is illustrative, and the scope of the present invention is limited only by the appended claims.

The disclosures of Japanese Patent Application No. 2004-371440 filed on Dec. 22, 2004 and No. 2005-237883 filed on Aug. 18, 2005 are incorporated herein.

What is claimed is:

1. An airbag capable of being inflated by gas from a gas generator, the airbag comprising:
    a front panel arranged on a passenger side;
    a rear panel arranged on an opposite side from the passenger side, the front panel and the rear panel being connected to each other along peripheral edge portions thereof;
    a port for the gas generator provided at a center of the rear panel;
    a columnar inner panel, securely fixed to the front panel and the rear panel so as not to break, for dividing an interior of the airbag into a first chamber at a center extending between the front panel and the rear panel when the airbag is fully inflated, and a second chamber which surrounds the first chamber, said inner panel having a communication hole for allowing gas to flow from the first chamber to the second chamber; and
    a low-strength connecting device for connecting a part of the inner panel together without connecting to the front and rear panels so that the communication hole is closed and capacity of the first chamber is reduced, said low-strength connecting device maintaining the connection so as to maintain the capacity of the first chamber at a relatively small first capacity until a gas pressure in the first chamber reaches a predetermined pressure, and releasing the connection when the gas pressure in the first chamber exceeds a predetermined pressure so as to make the capacity of the first chamber a second capacity larger than the first capacity and allow the gas to flow from the first chamber to the second chamber through the communication hole while limiting a position of the front panel relative to the rear panel by the columnar inner panel,
    wherein the inner panel connects the front and rear panels when the airbag is inflated more than the predetermined pressure and the low-strength connecting device releases the connection.

2. The airbag according to claim 1,
    wherein the inner panel comprises a first inner panel on the front panel side and a second inner panel on the rear panel side,
    a center portion or a portion in the vicinity thereof of the first inner panel is connected to the front panel by a high-strength center portion connecting device,
    a peripheral edge portion of the first inner panel is connected to a peripheral edge portion of the second inner panel by a connecting device, and
    a center portion of the second inner panel is formed with a port capable of being arranged substantially in a concentric relation with the rear panel port.

3. The airbag according to claim 2, wherein the low-strength connecting device connects the first inner panel and the second inner panel only, and the connecting device is a high-strength inner panel connecting device making the capacity of the first chamber relatively large when the low-strength connecting has released connection.

4. The airbag according to claim 2, wherein part of the first inner panel is connected to the front panel outside the high-strength center portion connecting device by another low-strength connecting device so as to reduce the capacity of the first chamber.

5. The airbag according to claim 2, wherein part of the second inner panel is connected to the rear panel by another low-strength connecting device so as to reduce the capacity of the first chamber.

6. The airbag according to claim 1, wherein the low-strength connecting device is a tear seam.

7. The airbag according to claim 6, wherein the tear seam comprises a stitched material capable of being broken when the pressure in the interior of the first chamber exceeds the predetermined pressure.

8. An airbag apparatus comprising an airbag and a gas generator having a gas injection port,
    the gas generator being arranged within the airbag at least on a distal end side thereof, and the gas injection port being arranged in the airbag,
    wherein the airbag is the airbag according to claim 1.

9. The airbag according to claim 1, wherein said inner panel includes a plurality of said communication holes radially equally spaced apart from each other in a center area of the inner panel.

10. The airbag according to claim 9, wherein said inner panel is partly overlapped so that the communication holes are closed, and the low-strength connecting device is arranged circularly to connect the overlapped inner panel to close the communication holes.

11. The airbag according to claim 10, wherein said inner panel further includes second communication holes at a side of the rear panel for communicating the first and second chambers, said second communication holes allowing the gas to flow from the first chamber to the second chamber before the gas pressure in the first chamber reaches the predetermined pressure.

* * * * *